United States Patent
Sawada et al.

(10) Patent No.: US 6,808,811 B1
(45) Date of Patent: Oct. 26, 2004

(54) PROTECTING FILM FOR POLARIZING PLATE AND POLARIZING PLATE

(75) Inventors: Takahiko Sawada, Kyoto (JP); Yasumasa Okada, Kyoto (JP); Hitoshi Kobayashi, Kyoto (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 09/856,162
(22) PCT Filed: Oct. 2, 2000
(86) PCT No.: PCT/JP00/06832
§ 371 (c)(1),
(2), (4) Date: Sep. 21, 2001
(87) PCT Pub. No.: WO01/25826
PCT Pub. Date: Apr. 12, 2001

(30) Foreign Application Priority Data

Oct. 4, 1999 (JP) .......................................... 11-283053
Feb. 4, 2000 (JP) .......................................... 2000-27921
Feb. 7, 2000 (JP) .......................................... 2000-029118

(51) Int. Cl.$^7$ ............................................. B32B 27/40
(52) U.S. Cl. ................................. 428/424.8; 428/424.2; 428/1.1; 428/1.31; 428/1.55
(58) Field of Search .......................... 428/424.8, 424.2, 428/1.1, 1.31, 1.55

(56) References Cited

U.S. PATENT DOCUMENTS 5,516,456 A * 5/1996 Shinohara et al. ..... 252/299.01
5,747,152 A * 5/1998 Oka et al. .................... 428/323

OTHER PUBLICATIONS

Patent Abstracts of Japan Pub. No. 06–051117, Nippon Zeon, Feb. 1994: JP version and machine translation.*

Oertel, G., ed. Polyurethane Handbook, 2nd ed., Hanser Publishers, New York: 1994, pp. 595–613.*

* cited by examiner

Primary Examiner—Sam A. Acquah
Assistant Examiner—Melanie Bissett
(74) Attorney, Agent, or Firm—Townsend & Banta

(57) ABSTRACT

The polarizing plate protection film of the present invention has excellent adhesion with the polarizer because of the polyurethane resin layer formed on the thermoplastic saturated norbornene-type resin film. In addition, blocking of the protection film can be prevented by the PVA layer formed on the polyurethane resin layer. The polarizing plate using the protection film of the present invention is excellent in terms of durability under high temperature and high humidity conditions, and it is suitably used for liquid crystal displays and such.

9 Claims, No Drawings

PROTECTING FILM FOR POLARIZING PLATE AND POLARIZING PLATE

TECHNICAL FIELD

The present invention relates to a polarizing plate protection film and a polarizing plate. The polarizing plate protection film of the present invention is excellent in terms of adhesive strength with the polarizer. The polarizing plate of the present invention is excellent in terms of durability under high temperature and humidity conditions. The polarizing plate is used for liquid crystal displays and such.

BACKGROUND ART

A polarizing plate is composed of a polarizer on either side of which a protection film is laminated.

Conventionally, a drawn polyvinyl alcohol film on which a dichroism dye or iodine is adsorbed is used for the polarizer. For the protection film, a triacetylcellulose film is used.

However, there is the following problem in this conventional technology:
1. There is not sufficient heat resistance and moisture resistance in the triacetylcellulose film which is the protection film.
    Therefore, the triacetylcellulose film peels off from the polarizer at high temperatures or under high humidity.
2. The transparency of the triacetylcellulose film, the protection film, lowers due to hydrolysis. As a result, the polarizing plate performance deteriorates due to a reduction in the degree of polarization.
3. When stress arises due to the orientation relaxation of the polyvinyl alcohol (hereafter referred to as "PVA") of the protection film at high temperatures, the triacetylcellulose (hereafter referred to as "TAC") of the protection film will have a large birefringence.

Display nonuniformity and a contrast reduction in the LCD result due to a reduction in the degree of polarization.

The use of a thermoplastic saturated norbornene-type resin is proposed instead of the TAC in a polarizing plate protection film in order to solve the aforesaid problem.

However, though a PVA type adhesive is used for the adhesion between the TAC and the PVA, in the adhesion between a thermoplastic saturated norbornene-type resin and PVA, the adhesive strength of the PVA type adhesive is insufficient.

Because of this, a bonding method between the thermoplastic saturated norbornene-type resin and the PVA is proposed in Tokkai Hei 5-212828 and such. This method is a method for bonding a thermoplastic saturated norbornene-type resin film with an acrylic pressure sensitive adhesive layer to PVA by means of heat pressurization.

However, there are the following problems in this method:
1. The polarizing function of the polarizing plate is lost through discoloration and color fading of the PVA of the polarizer because heat clamping is necessary and the heating time is long.
2. The degree of polarization of the polarizing plate is reduced due to deformation contraction or degradation of the PVA, even if the polarizing function does not disappear.
3. Since heat clamping for a fixed amount of time is necessary, the production efficiency is low.
4. The manufacturing facility becomes expensive because heating and pressurization are necessary for the whole film.
5. The durability of the polarizing plate is low because adhesive strength nonuniformity arises due to uneven heating temperatures and pressurization of the whole film, resulting in poor quality.
6. The conventional bonding method of wet-lamination using a PVA type adhesive cannot be adopted as is.

The objects of the present invention are as follows.
1. To provide a polarizing plate protection film and a polarizing plate which solve the aforesaid problem in the technical field of a polarizing plate protection film using the thermoplastic saturated norbornene-type resin film.
2. (Regarding the bonding method between the polarizer and the polarizing plate protection film) to provide a polarizing plate with sufficient adhesive strength to allow the use of a conventional bonding method by wet lamination of the PVA type adhesive as is.
3. To provide a polarizing plate which solves the aforesaid problem by bonding the polarizing plate protection film made of the thermoplastic saturated norbornene-type resin and the PVA polarizer by means of a polyurethane adhesive.

DISCLOSURE OF INVENTION

1. The present invention is a polarizing plate protection film consisting of a thermoplastic saturated norbornene-type resin film on which a polyurethane resin layer is formed.
2. The present invention is a polarizing plate protection film wherein a polyurethane resin layer and a polyvinyl alcohol layer are formed in this order on a thermoplastic saturated norbornene-type resin film.
3. The present invention is said polarizing plate protection film wherein said polyurethane resin layer consists of a polyurethane adhesive which contains modified polyisocyanate.
4. The present invention is said polarizing plate protection film wherein said polyurethane resin layer consists of a water-type polyurethane adhesive.
5. The present invention is a polarizing plate wherein said polarizing plate protection film is bonded onto at least one side of the polarizer by wet lamination using a polyvinyl alcohol-type adhesive.
6. The present invention is a polarizing plate wherein a polyvinyl alcohol polarizer and a protection film which consists of the thermoplastic saturated norbornene-type resin are bonded together with a polyurethane adhesive.
7. The present invention is said polarizing plate wherein said polyurethane adhesive is a two-component type and the main agent consists of a polyester resin.
8. The present invention is said polarizing plate in which said polyurethane adhesive consists of a water-type polyurethane adhesive.

The advantages of the invention are the following:
1. The polarizing plate protection film of the present invention can provide a polarizing plate which is excellent in terms of durability.
2. It is possible to wet-laminate the polarizing plate protection film of the present invention onto the polarizer. Therefore, the polarizing plate can be manufactured without changing the protection film bonding process from the conventional method.
3. The polarizing plate of the present invention has excellent optical characteristics. In addition, the optical characteristics and appearance characteristics do not deteriorate under high temperature and humidity conditions and the polarizing plate has the excellent durability.

BEST MODE FOR CARRYING OUT THE INVENTION

The present invention is described in detail below.
"Thermoplastic Saturated Norbornene-Type Resin for the Present Invention"

It is possible to use a prior art thermoplastic saturated norbornene-type resin.

The thermoplastic saturated norbornene-type resin is a resin whose polymerization unit has the norbornane skeleton. The norbornane skeleton may have substitutional groups such as an alkyl group, carboxyl group, or phenyl group.

Prior art resins have been described in Japanese unexamined patent publication Tokkai Hei 1-240517, Tokkai-Sho 62-252406, Tokkai-Sho 62-252407, Tokkai-Hei 2-133413, Tokkai-Sho 63-145324, Tokkai-Sho 63-264626, Tokkai-Sho 57-8815, etc. Examples follow:

A hydrogenated product of the ring-opened polymer of the norbornene-type monomer, a hydrogenated product of a copolymer of two or more types of norbornene-type monomers, a hydrogenated product of a copolymer of a norbornene-type monomer and an olefin-type monomer (ethylene, α-olefin, etc.), a hydrogenated product of a copolymer of a norbornene-type monomer and a cyclic olefin-type monomer (cyclopentene, cyclooctene, 5,6-dihydro dicyclopentadiene, etc.), and modified products of the aforesaid resins.

Examples of the monomers used for the thermoplastic saturated norbornene-type resin are as follows: norbornene, 5-methyl-2-norbornene, 5-ethyl-2-norbornene, 5-butyl-2-norbornene, 5-ethylidene-2-norbornene, 5-methoxycarbonyl-2-norbornene, 5,5-dimethyl-2-norbornene, 5-cyano-2-norbornene, 5-methyl-5-methoxycarbonyl-2-norbornene, 5-phenyl-2-norbornene, 5-phenyl-5-methyl-2-norbornene, ethylene-tetracyclo dodecen copolymer, 6-methyl-1,4:5,8-dimethano-1,4,4a, 5,6,7,8, 8a-octahydronaphthalene, 6-ethyl-1,4:5,8-dimethano-1,4,4a and 5,6,7,8,8a-octahydronaphthalene, 6-ethyl-1,4:5,8-ethylidene-1,4,4a and 5,6,7,8,8a-octahydronaphthalene, 6-chloro-1,4:5,8-dimethano-1,4,4a, 5,6,7,8,8a-octahydronaphthalene, 6-cyano-1,4:5,8-dimethano -1,4,4a, 5,6,7,8,8a-octahydronaphthalene, 6-pyridyl-1,4,5,8-dimethano-1,4,4a5,6,7,8,8a-octahydronaphthalene 6-methoxycarbonyl-1,4,5,8-dimethano-1,4,4a 5,6,7,8,8a-octahydronaphthalene 1,4-dimethano-1,4, 4a 4b 5,8,8a 9a-octahydro fluorene, 5,8-methano-1,2,3,4,4a, 5,8,8a-octahydro-2,3-cyclopenta dieno naphthalene, 4,9:5,8-dimethano-3a, 4,4a, 5,8,8a, 9,9a-octahydro-1H-benzindene, 4,11:5,10:6,9-trimethano-3a, 4,4a, 5,5a, 6,9,9a, 10,10a, 11,11a-dodecahydro-1H-cyclopenta anthracene, 8-carboxymethyl tetracyclo $[4,4,0,1^{2,5},1^{7,10}]$-3-dodecen, 8-carboxyethyl tetracyclo $[4,4,0,1^{2,6},1^{7,10}]$-3-dodecen, and 8-methyl 8-carboxymethyl tetracyclo $[4,4,0,2,1^{2,5},1^{7,10}]$-3-dodecen.

It is possible to use a prior art method for polymerization of the norbornene-type monomer. As necessary, the norbornene monomer can be copolymerized with other monomers. The obtained polymer can be turned into the hydrogenated product by hydrogenation. The polymer and polymer hydrogenated product may be modified by a prior art method.

Examples of the compound for the modification are as follows: α, β-unsaturated carboxylic acid and its derivatives, styrene-type hydrocarbons, organic silicon compounds with a hydrolyzable group or olefin-type unsaturated bonds, and unsaturated epoxy monomers.

Polymerization is conducted using the following polymerization catalysts. Examples of the polymerization catalysts are as follows: hydrated salts of trichlorides of Ir, Os and Ru, $MoCl_5$, $WCl_6$, $ReCl_5$, $(C_2H_5)_3Al$, $(C_2H_5)_3Al/TiCl_4$, $(\pi-C_4H_7)_4Mo/TiCl_4$, and $(\pi-C_4H_7)_4W/TiCl_4$, and $(\pi-C_3H_5)_3Cr/WCl_6$.

Examples of commercial products of the thermoplastic saturated norbornene-type resin are as follows:
Trade name "ZEONOR" and "ZEONEX" from Nippon Zeon Co.
Trade name "ARTON" from JSR Co.,
Trade name "OPTOREZ" from Hitachi Chemical Co., and
Trade name "APEL" from Mitsui Chemical Inc.

If the number average molecular weight of the thermoplastic saturated norbornene-type resin decreases, then the film strength may lower and the water-vapor transmission may increase due to the lowering of moisture resistance. If the number average molecular weight increases, then the film formability lowers.

Therefore, the preferable number average molecular weight is 10,000–100,000. A more preferable number average molecular weight is 20,000–80,000. The number average molecular weight is measured with GPC using toluene solvent.

The thermoplastic saturated norbornene-type resin film is manufactured with any prior art method. For example, the film can be manufactured with the solution casting method or the melt molding method.

Manufacturing of a film by the solution casting method is as follows.

1. A resin solution of 5–60 weight % is prepared by dissolving the thermoplastic saturated norbornene-type resin in a high boiling-point solvent, low boiling-point solvent or a mixed solvent of these. Examples of the high boiling-point solvent are as follows: toluene, xylene, ethylbenzene, chlorobenzene, triethylbenzene, diethyl benzene, and isopropyl benzene. Examples of the low boiling-point solvent are as follows: methylene chloride, cyclohexane, benzene, tetrahydrofuran, hexane, and octane.

2. Said resin solution is casted on a heat-resistant film (polyethylene terephthalate, etc.), steel belt, or metal foil, and dried by heating.

For the casting of the resin solution, the bar coater, doctor knife, Mayer bar, roll, or T-die is used.

Examples of the manufacturing technique of a film by the melt molding method are as follows: the hot-melt extrusion method using a T-die, a hot-melt extrusion method such as the inflation method, calender method, hot pressing method, and injection molding method.

The following additives may be added to the thermoplastic saturated norbornene-type resin film in order to improve heat-resistance, ultraviolet light resistance, smoothness, etc. of the film, within a range which does not affect the effect of the present invention:

Anti-aging additives (phenol types, phosphorus types, etc.), thermal degradation inhibitors (such as phenol types), antistatics (such as amine types), lubricants (such as fatty acid amides, aliphatic alcohol esters and partial esters of polyhydric alcohols), ultraviolet light absorbents (benzophenone types, benzotriazole types, cyanoacrylate types, etc.), and levelling additives (special acrylic resin types, silicone, etc.).

"Invention of Claims 1–5"
Polarizing Plate Protection Film

The preferable thickness of said thermoplastic saturated norbornene-type resin film for the present invention is 5–500 micrometers, and the more preferable thickness is 10–150 micrometers. The optimum thickness is 15–100 micrometers.

If the thickness of the film is under 5 micrometers then the strength lessens. In addition, there is a problem in that the curling increases in the durability test.

The transparency lessens when the thickness of the film exceeds 500 micrometers. In addition, there is a problem that the drying of water which is a solvent of the PVA adhesive slows down because the moisture permeability decreases.

The polarizing plate protection film of the present invention consists of a polyurethane resin layer formed on at least one side of a thermoplastic saturated norbornene-type resin film. This polyurethane resin layer is formed by applying a polyurethane adhesive to the thermoplastic saturated norbornene-type resin film.

It is desirable that the surface treatment is conducted on the thermoplastic saturated norbornene-type resin film before the polyurethane resin layer is formed.

Examples of the method of the surface treatment include the corona discharge and the ultraviolet light irradiation methods. The preferable wetting index achieved by the surface treatment is 45 dynes/cm or more, and more preferable wetting index is over 50 dynes. The wetting index refers to the critical surface tension defined by Zisman, and it is measured based on JIS K 8768 using the standard wetting reagent.

In the present invention, the polyurethane resin layer is formed by applying a polyurethane adhesive to be a thin film. A preferable polyurethane adhesive is an adhesive for lamination.

If the protection film is wound in a roll after the formation of the polyurethane resin layer, it is necessary that there is no tack after the adhesive is dried. The tack is judged by finger touching. If there is tack then blocking happens when the film is wound. Considering the tack, a preferable adhesive is a one-component polyurethane adhesive which contains modified polyisocyanate.

"Description of the One-Component Polyurethane Adhesive Which Contains Modified Polyisocyanate"

A modified polyisocyanate is prepared by reacting polyisocyanate with a compound having a hydroxyl group, amino group, carboxyl group, etc., and turning it into a high molecular weight state. The ends of the modified polyisocyanate have at least two NCO groups left.

Examples of modified polyisocyanate are as follows: urethane-modified product, alohanate-modified product, urea-modified product, and isocyanate propolymer.

Urethane-modified product is a modified product prepared by a reaction between polyisocyanate and polyfunctional hydroxy compound. Modification is done such that the molar ratio (NCO/OH) of the polyisocyanate and polyfunctional hydroxy compound is at least 2/1.

Alohanate-modified product is a modified product which is prepared by a partial reaction between polyisocyanate and polyfunctional hydroxyl wherein the product has an alohanate bond prepared by the reaction between the urethane unit and isocyanate, as well as an NCO group at the end.

The urea-modified product is a modified product which is prepared by a partial reaction of polyisocyanate and an amine compound and has a urea bond which is produced by a reaction between isocyanate and amine, as well as an NCO group at the end.

The biuret-modified product is a modified product which is prepared by a partial reaction between polyisocyanate and an amine compound or a reaction with water and has a biuret bond, as well as an NCO group at the end.

Isocyanate prepolymer is a prepolymer prepared by a reaction between polyisocyanate and polyol (polyetherpolyol, polyester polyol, etc.) having an NCO group at the end (the molar ratio of NCO/OH is at least 2/1). The prepolymer can have ionizable groups such as ammonium, sulfonium, sulfate, and carboxylate.

In the present invention, the polyurethane adhesive may contain polyisocyanate and other additives in addition to the modified polyisocyanate.

Polyisocyanate is a compound with two or more NCO groups. Examples of polyisocyanate are as follows: toluene diisocyanate (TDI), 4,4'-diphenyl-methane diisocyanate (MDI), 1,5-naphthalene diisocyanate (NDI), tolidine diisocyanate (TODI), HDI (hexamethylene diisocyanate), IPDI (isophorone diisocyanate), p-phenylene diisocyanate, transcyclohexane 1,4-diisocyanate, xylene diisocyanate (XDI), hydrogenated XDI, hydrogenated MDI, lysine diisocyanate (LDI), tetramethyl xylene diisocyanate (TMXDI), lysine ester triisocyanate, 1,6,11-undecane triisocyanate, 1,8-diisocyanate-4-isocyanate methyl octane, 1,3,6-hexamethylene triisocyanate, bicycloheptane triisocyanate, and trimethylhexamethylene triisocyanate.

Examples of the other additives are as follows:

Coupling agents (such as silane coupling agents and titanate coupling agents), tackifiers (such as terpene resin, phenol resin, terpene-phenol resin, rosin resin, and xylene resin), ultraviolet light absorbents, antioxidants, stabilizers (heat stabilizers, heat hydrolysis stabilizers, etc.), and dispersing agents (various surfactants).

The polyurethane adhesive can be a solvent type or water type.

Examples of commercial products of one-component solvent type polyurethane adhesives include "CAT-56" and "TM-225B" from Toyo-Morton Co., Ltd.

Selection of the solvent used is not limited, as long as the adhesive component uniformly dissolves in it. A preferable solvent is ethyl acetate.

A water type polyurethane adhesive is a polyurethane adhesive for which water is the dilution solvent. Specific examples include emulsions, colloidal dispersions, aqueous solutions, etc.

An example of a commercial product of the one-component water type urethane adhesive is "EL-436B" from Toyo-Morton Co., Ltd.

The method for forming the polyurethane resin layer on the thermoplastic saturated norbornene-type resin film is described below.

1. Considering the thickness after drying and smoothness of the application, the polyurethane adhesive is diluted to an adequate concentration (for example, 1–50 weight %).
2. This diluted adhesive is applied on the thermoplastic saturated norbornene-type resin film, followed by drying. The application is carried out by using a gravure coater, micro gravure coater, Mayer bar, etc. with a prior art method.

The thickness of the polyurethane resin layer after drying is preferably 0.01–20 micrometers. A more preferable thickness is 0.05–10 micrometers. Sufficient adhesive strength is not obtained when the thickness is under 0.01 micrometers. Discoloration of the polarizing plate tends to occur in the damp-proof test if the thickness exceeds 20 micrometers.

"Description of the PVA Layer on the Polyurethane Resin Layer"

In the present invention, it is possible to form a PVA layer on top of the polyurethane resin layer. This can prevent blocking which would otherwise occur in the coiling of a norbornene-type resin film.

It is also possible to use not only a two-component type but also a one-component type polyurethane adhesive if the PVA layer is successively formed, without coiling, after the formation of the polyurethane resin layer. The two-component type polyurethane adhesive can be either a water type or a solvent type. For the two-component type polyurethane adhesive, "a two-component type adhesive consisting of a main agent having an OH group at the end and a hardener having an NCO group", which will be described later, can also be used.

The PVA layer can consists of just PVA, but boric acid can be added to it as well.

Although the molecular weight and the degree of saponification of the PVA can be decided at will, a preferable degree of polymerization is 800–4,000, and a preferable degree of saponification is 90 mol % or more.

The gelation by cross-linking reactions is promoted and preparation of the aqueous solution becomes difficult if the dosage of boric acid exceeds 20 weight % of the PVA. Therefore, 20 weight % or less is desirable. The PVA can demonstrate adequate performance in practical use, even if boric acid is not added.

There are the following methods for forming the PVA layer. Either method may be used.
1. A formation method in which a PVA aqueous solution is applied and dried.
2. A formation method in which a commercially available PVA film is applied on.

Considering the thickness adjustment and the adhesive strength, the formation method in which a PVA aqueous solution is applied and dried is preferable. The concentration of the PVA aqueous solution is determined in consideration of the adhesive property and smoothness of the application; 1–20 weight % is preferable. The application method is based on a prior art method.

The thickness of the PVA layer is preferably 0.01–20 micrometers, and a more preferable thickness is 0.05–10 micrometers. Control of the thickness becomes difficult when the thickness is under 0.01 micrometers. Discoloration of the polarizing plate tends to occur in the damp-proof test if the thickness exceeds 20 micrometers because moisture can easily invade from the cut surface.

The Polarizing Plate

The polarizing plate is manufactured by laminating the thermoplastic saturated norbornene-type resin film, which constitutes the polarizing plate protection film, on at least one side of the polarizer.

For the polarizer, a film or sheet made of PVA which functions as a polarizer is used. Examples of the polarizer are as follows:
1. A PVA-iodine type polarizer The PVA film is made to adsorb iodine, followed by uniaxial drawing in a boric acid bath.
2. A PVA-dye type polarizer A direct dye with a high dichroism is diffused and adsorbed on/in the PVA film, followed by uniaxial drawing.
3. A PVA-polyene type polarizer The polyene structure is formed by a dehydration reaction of a drawn PVA film.

The PVA film or sheet with the function of the polarizer is prepared by drawing a polyvinyl alcohol type film or sheet. Polyvinyl alcohol (PVA) is manufactured by the saponification of polyvinyl acetate. Polyvinyl acetate is manufactured by the polymerization of vinyl acetate. A small amount of copolymerization components such as unsaturated carboxylic acid (including its salts, esters, amides, nitrites, etc.), olefins and vinyl ethers, and unsaturated sulfonate may be copolymerized with vinyl acetate. The PVA for the present invention is not limited to PVA manufactured by the aforesaid method.

The degree of saponification of PVA is preferably 85–100 mol %, and a more preferable degree of saponification is 98–100 mol %. The average degree of polymerization of PVA is not limited, as long as a film or sheet can be formed and it develops the function of a polarizer after being drawn. The average degree of polymerization is preferably 1,000 or more, and more preferably about 1,500–5,000.

The PVA polarizer can be manufactured using said PVA with a conventional method.

It is adequate if the polarizing plate protection film of the present invention is laminated on at least one side of the polarizer. A highly transparent film can be provided on the other side of the polarizer. The thermoplastic saturated norbornene-type resin may be used on both sides of the polarizer.

The side on which the protection film of the present invention must be laminated is the liquid crystal cell side. Retardation changes at high temperatures and high humidity cannot be suppressed if the protection film of the present invention is not used on this side.

Although the method for laminating the polarizing plate protection film on the polarizer is a prior art method, adhesion with wet lamination using a PVA type adhesive is preferable. A preferable method is as follows:
1. An aqueous solution of the PVA adhesive is applied on the polarizing plate protection film.
2. This film is laminated on the polarizer.
3. The protection film is bonded to the polarizer by hot air drying.

Effect of the Present Invention

The present invention has the following effects:
1. Because the photoelastic constant is small for the thermoplastic saturated norbornene-type resin, large retardations do not arise even when the stress generated by the contraction of the PVA polarizer during the durability test is incurred on the protection film. Therefore, it is possible to suppress the reduction in the degree of polarization of the polarizing plate.
2. The moisture permeability of the protection film can be decreased further than the saponified TAC. Therefore, it is possible to suppress the invasion of moisture during the damp-proof test of the polarizing plate.
3. The same conventional bonding method used for the TAC type protection film can be used. Sufficient adhesive strength is obtained by the PVA type adhesive.
4. By laminating the PVA layer on the polyurethane resin layer, blocking can be suppressed when winding the polarizing plate protection film.

"The Invention of Claim 6–8"

5–500 micrometers is preferable for the thickness of the protection film which consists of the thermoplastic saturated norbornene-type resin used in the present invention. The more preferable thickness is 10–150 micrometers, and the most preferable thickness is 15–100 micrometers.

If the protection film is too thin then the strength lessens and the curling increases in the durability test.

If the protection film is too thick then the transparency is reduced, the birefringence increases, and the moisture permeability is reduced. When the moisture permeability is reduced the drying of the water-based adhesive is delayed. If the birefringence increases then there is a problem in that, when the polarizing plate of the present invention is used for a liquid crystal display, the contrast is reduced.

For the adhesion between the protection film and the PVA polarizer, a polyurethane adhesive is used.

For the polyurethane adhesive, there are the solvent type, which uses an organic solvent for the diluent, and the water type (emulsions, colloidal dispersions, aqueous solutions, etc.), either of which can be used.

The aforesaid polyurethane adhesive may be diluted with an organic solvent such that the prescribed thickness is obtained after drying. Selection of the organic solvent is not limited, as long as the adhesive resin can be uniformly dissolved. Examples of the organic solvent are as follows: toluene, methylethylketone, ethyl acetate, etc. Organic solvents in which the protection film is dissolved or swollen should be avoided.

The dilution concentration of the solvent is adjusted for an adequate thickness and appearance after drying. The preferable dilution concentration is solid concentration 0.1–50 weight %.

The aforesaid water type polyurethane adhesive may be diluted by water in order to obtain the prescribed thickness after drying. As a diluting solution, water with an added organic solvent may be used. Examples of the organic solvent added to water are as follows: alcohols (n-butyl alcohol, isopropanol, etc.) and ketones (acetone, etc.). The organic solvent should be added to water in order to improve smoothness of the application and drying properties. A preferable content of the organic solvent is 40 weight % or less of the total amount of the adhesive solution. The dilution concentration of the solvent is adjusted for an adequate thickness and appearance after drying. The preferable dilution concentration is solid concentration 0.1–50 weight %.

For the polyurethane adhesive, there are the one-component type, which is composed of a compound having terminal NCO groups, and the two-component type, which is composed of a main agent having terminal OH groups and a hardener having NCO groups. In the present invention, either of them can be used as long as the coating film is transparent. In view of the adhesion performance, the two-component type adhesive for lamination is preferable. The description of the one-component polyurethane adhesive is described above.

Description of "The two-component type composed of a main agent having terminal OH groups and a hardener having NCO groups"

Examples of the main agent with terminal OH groups are as follows: a low-molecular polyol with a molecular weight of 1,000 or less, a polyether polyol, a polyester polyol, and other OH type raw materials. Specific examples are shown below. One or two or more of the following can be mixed for use.

Examples of the low-molecular polyol are as follows: ethylene glycol (EG), diethylene glycol (DEG), di-propylene glycol (DPG), 1,4-butanediol (1,4-BD), 1,6-hexanediol (1,6-HD), neopentylglycol (NPG), and trimethylolpropane.

Examples of the polyetherpolyol are as follows: polyethylene glycol, polypropylene glycol, ethylene oxide/propylene oxide copolymer, tetrahydrofuran/ethylene oxide copolymer, poly tetramethylene ether glycol, and polyetherpolyol whose chain is extended by urethan-bond using polyisocyanate.

For the polyesterpolyol, there are polyesterpolyol whose chain is extended by urethan-bond and a polymer polyester. 10,000–100,000 is desirable for the molecular weight.

Polyesterpolyol whose chain is extended by urethan-bond is prepared by having terminal OH groups of low molecular weight polyester (Mw 500–3,000) react with polyisocyanate to bind together. There is an OH group on both ends of the chain.

Examples of the polymer polyester include lactone polyester (poly β-methyl-δ-valerolactone, polycaprolactone, etc.) and polyester from diol/dibasic acid. Examples of the diol include EG, DEG, DPG, 1,4-BD and 1,6-HD, and NPG. Examples of the dibasic acid include adipic acid, azelaic acid, cebacic acid, isophthalic acid, terephthalic acid, etc.

Examples of the other OH type raw materials include castor oil, epoxy resin, polycarbonate diol, and acrylic polyol (compound with active hydrogen).

Of the main agents described above, a polyester resin of polyester polyol is preferable. Examples of commercial products are as follows.

The solvent type: "TM-593", "TM-225A", "AD-585" (from Toyo-Morton Co., Ltd), "Dicdry LX-903" (from Dainippon Ink and Chemicals, Inc.).

The water type: "EL-436A" (from Toyo-Morton Co., Ltd).

Examples of the aforesaid hardener which contains NCO groups include polyisocyanate and modified polyisocyanate. The description for these is the same as in the description of the one-component polyurethane adhesive.

Polyisocyanate is a compound which has two or more NCO groups. Examples of polyisocyanate include toluene diisocyanate (TDI), 4,4'-diphenyl-methane diisocyanate (MDI), 1,5-naphthalene diisocyanate (NDI), o-tolidine diisocyanate (TODI), HDI (hexamethylene diisocyanate), IPDI (isophorone diisocyanate), p-phenylene diisocyanate, transcyclohexane 1,4-diisocyanate, xylene diisocyanate (XDI), hydrogenated XDI, hydrogenated MDI, lysine diisocyanate (LDI), tetramethyl xylene diisocyanate (TMXDI), lysine ester triisocyanate, 1,6,11-undecanetriisocyanate, 1,8-diisocyanate-4-isocyanate methyl octane, 1,3,6-hexamethylene triisocyanate, bicycloheptane triisocyanate, and trimethylhexamethylene triisocyanate.

The modified polyisocyanate is prepared by increasing the molecular weight of polyisocyanate by a reaction with a compound having a hydroxyl group, amino group, carboxyl group, etc. At the terminal of the modified polyisocyanate, there are at least two NCO groups left. Specific examples are the same as those in the description of the aforesaid one-component adhesive.

Commercially available hardeners are as follows:

The solvent type: "CAT-56", "CAT-RT85", "CAT-10", "TM-225B" (all from Toyo-Morton Co., Ltd), "Dicdry LX-903" (from Dainippon Ink and Chemicals, Inc.), and "Takenate A-3" (from Takeda Chemical Industries, Ltd.

The water type: "EL-436B" (from Toyo-Morton Co., Ltd.)

Additives can be mixed with the polyurethane adhesive. Examples of additives are as follows: coupling agents (silane coupling agents, titanate coupling agents, etc.), tackifiers (terpene resins, phenol resins, terpene-phenol resins, rosins, xylene resins, etc.), thixotropy agents (aerosil and Disparon), ultraviolet light absorbents, antioxidants, stabilizers (thermostable stabilizers and hydrolysis-proof stabilizers), and dispersing agents (various surfactants).

If the adhesive thickness applied on the protection film is too thin then the adhesive strength becomes inadequate, causing peeling. If the adhesive thickness is too thick then the transparency is degraded.

The adhesive thickness is the thickness of the adhesive layer between the polarizer and the thermoplastic saturated norbornene-type resin film. The preferable thickness after drying is 0.01–50 micrometers, and more preferably 0.1–30 micrometers.

As a means to improve the adhesive strength of the aforesaid adhesive, a surface treatment such as the corona treatment may be conducted to the thermoplastic saturated norbornene-type resin film.

For the method of laminating the aforesaid PVA polarizer and the protection film, either the wet a lamination or the dry lamination can be used. In view of the adhesive strength, the dry lamination method is preferable when a solvent type adhesive is used. When a water type adhesive is used, the wet lamination method is more preferable because the conventional polarizing plate manufacturing process can be used as is.

The wet lamination method is described below:
1. The urethane adhesive is diluted with water such that the solid concentration is adequate in view of the thickness after drying, smoothness of the application, etc. (for example, 0.1–50 weight %).
2. This adhesive solution is applied on the polarizer or protection film. A Mayer bar, gravure coater, micro gravure coater, etc. can be used for the application procedure.
3. The protection film is laminated on the polarizer, and bonded by means of hot air drying.

The dry lamination method is described below:
1. The urethane adhesive is diluted with a diluent solvent such that the solid concentration is adequate in view of the thickness after drying, smoothness of the application, etc.
2. This adhesive solution is applied on the polarizer or protection film. A Mayer bar, gravure coater, micro gravure coater, etc. can be used for the application procedure.
3. The adhesive is dried in a drying oven. The drying temperature ranges from ordinary temperatures to 130° C.
4. The lamination of the protection film is laminated by means of pressure adhesion using a roll at a pressure of 1–10 kgf/cm (line pressure). It may be heated to the temperature of 120° C. or less, as long as an optical change in the polarizer does not occur. A preferable heating temperature is 30–100° C.

However, the present invention is not limited to the methods described above.

Effects of the Polarizing Plate of the Present Invention
1. Optical characteristics do not deteriorate in the durability test.

The polarizing plate of the present invention has improved adhesive strength between the PVA polarizer and the thermoplastic saturated norbornene-type resin protection film.

In addition, foaming of the adhesion plane and peeling of the protection film are remarkably improved.
2. The contraction of the polarizer is reduced, and the reduction in the degree of polarization can also be improved.

EXAMPLES

Next, the present invention is explained by referring to Examples. The present invention is not limited the following Examples.
"Invention Described in Claims 1–5"
1. Preparation of the Polarizing Plate Protection Film Thermoplastic saturated norbornene-type resin films (1) and (2) to be used in Examples were prepared. The following polycarbonate film and saponified TAC film were used for Comparative examples.

1-1. Thermoplastic Saturated Norbornene-Type Resin Film (1)

The norbornene-type resin (from JSR Co., trade name: ARTON G) was dissolved in toluene to obtain a 35 weight % solution. This solution was cast on a PET film and dried at 80° C. for 5 minutes, and then dried at 120° C. for 5 minutes. After the resin film was torn off from the PET film it was dried at 150' for 3 minutes. The resin film thickness after the drying was 50 micrometers.

1-2. Thermoplastic Saturated Norbornene-Type Resin Film (2)

A 50-micrometer thick norbornene-type resin film (Nippon Zeon Co., trade name: ZEONEX # 490 K) was prepared by melt-extrusion with a T-die.

1-3. Polycarbonate (PC) Film

A commercial 70-micrometer thick PC film (TEIJIN Co., product number: C-120-70) was used.

1-4. Saponified TAC Film

A commercial 80-micrometer thick TAC (Fuji Photo Film Co., Ltd. trade name Fujitac Clear) was saponified.

2. Surface Treatment of the Polarizing Plate Protection Film:

A surface treatment (corona discharge) was carried out on the aforesaid norbornene-type resin films (1) and (2) and the aforesaid PC film. After the surface treatment, the wetting index was measured using the wetting indicator. The wetting index was 70 dynes or more for each of them.

3. Polarizing Plate Protection Film

Example 1

An adhesive solution with a solid concentration of 10 weight % was prepared by diluting a commercial polyurethane adhesive (from Toyo-Morton Co.; Ltd. trade name: CAT-56) with ethyl acetate. This was applied on a corona-discharged plane of norbornene-type resin film (1) by using Mayerbar #8. After drying for two minutes at 80° C., the polyurethane resin layer was obtained. The average thickness of the polyurethane resin layer after the drying was 0.7 micrometers.

Example 2

An adhesive solution with a solid concentration of 10 weight % was prepared by diluting a commercial polyurethane adhesive (from Toyo-Morton Co., Ltd trade name: CAT-56) with ethyl acetate. This was applied on a corona-discharged plane of norbornene-type resin film (2) by using Mayerbar #8. After drying for two minutes at 80° C., the polyurethane resin layer was obtained. The average thickness of the polyurethane resin layer after the drying was 0.7 micrometers.

Example 3

An adhesive solution with a solid concentration of 10 weight % was prepared by diluting a commercial polyurethane adhesive (from Toyo-Morton Co., Ltd trade name: TM-225 B) with ethyl acetate. This was applied on a corona-discharged plane of norbornene-type resin film (2) by using Mayerbar #30. After drying for two minutes at 80° C., the polyurethane resin layer was obtained. The average thickness of the polyurethane resin layer after the drying was 3 micrometers.

Example 4

An adhesive solution with a solid concentration of 10 weight % was prepared by diluting a commercial polyurethane adhesive (from Toyo-Morton Co., Ltd trade name: CAT-56) with ethyl acetate. This was applied on a corona-discharged plane of norbornene-type resin film (1) by using Mayerbar #8. After drying for two minutes at 80', the polyurethane resin layer was obtained. The average thickness of the polyurethane resin layer after the drying was 0.7 micrometers. A 5-weight % aqueous solution of PVA (from Kuraray Co., Ltd., trade name: SI) was applied on the polyurethane resin layer by means of Mayerbar #8. After drying for two minutes at 80° C., the PVA layer was obtained. The average thickness of the PVA layer after the drying was 0.9 micrometers.

Example 5

An adhesive solution with a solid concentration of 10 weight % was prepared by diluting a commercial polyurethane adhesive (from Toyo-Morton Co., Ltd trade name: CAT-56) with ethyl acetate. This was applied on a corona-discharged plane of norbornene-type resin film (2) by using Mayerbar #8. After drying for two minutes at 8⁰° C., the polyurethane resin layer was obtained. The average thickness of the polyurethane resin layer after the drying was 0.7 micrometers. A 5-weight % aqueous solution of PVA (from Kuraray Co., Ltd., trade name: SI) was applied on the polyurethane resin layer by means of Mayerbar #30. After drying for two minutes at 80° C., the PVA layer was obtained. The average thickness of the PVA layer after the drying was 2.5 micrometers.

Example 6

An adhesive solution with a solid concentration of 10 weight % was prepared by diluting a commercial polyurethane adhesive (from Toyo-Morton Co., Ltd trade name: TM-225B) with ethyl acetate. This was applied on a corona-discharged plane of norbornene-type resin film (2) by using Mayerbar #30. After drying for two minutes at 80° C., the polyurethane resin layer was obtained. The average thickness of the polyurethane resin layer after the drying was 3 micrometers. A 5-weight % aqueous solution of PVA (from Kuraray Co., Ltd., trade name: SI) was applied on the polyurethane resin layer by means of Mayerbar #8. After drying for two minutes at 80° C., the PVA layer was obtained. The average thickness of the PVA layer after the drying was 0.9 micrometers.

Example 7

An adhesive solution with a solid concentration of 5 weight % was prepared by diluting a commercial polyurethane adhesive (from Toyo-Morton Co., Ltd, trade name: EL-436B) with water. This was applied on a corona-discharged plane of the norbornene-type resin film (1) by using Mayerbar #8. After drying for three minutes at 90° C., the polyurethane resin layer was obtained. The average thickness of the polyurethane resin layer after the drying was 0.7 micrometers.

Example 8

An adhesive solution with a solid concentration of 5 weight % was prepared by diluting a commercial polyurethane adhesive (from Toyo-Morton Co., Ltd, trade name: mixture of EL-436A/EL-436B with a 10:3 weight ratio) with water. This was applied on a corona-discharged plane of the norbornene-type resin film (1) by using Mayerbar #8. After drying for three minutes at 90%, the polyurethane resin layer was obtained. The average thickness of the polyurethane resin layer after the drying was 0.7 micrometers. A 5-weight % aqueous solution of PVA (from Kuraray Co., Ltd., trade name: Kuraray Poval Resin PVA-117H) was applied on the polyurethane resin layer by means of Mayerbar #8. After drying for three minutes at 80° C., the PVA layer was obtained. Ther average thickness of the PVA layer after the drying was 0.7 micrometers.

Comparative Example 1

Using the same method as Example 1, the polyurethane resin layer was formed on the corona-discharged plane of a PC film.

Comparative Example 2

Using the same method as Example 4, the polyurethane resin layer and the PVA layer were formed on the corona-discharged plane of a PC film.

Comparative Example 3

A saponified TAC film was used as is for the polarizing plate protection film.

4. Preparation of the Polarizer.

An un-oriented PVA film with a thickness of 75 micrometers and a degree of saponification of 99% was washed in water at room temperature. After the washing, a longitudinal uniaxial drawing of 5 times was carried out. While retaining the tension of this film, dichroism pigment was adsorbed into this film in an aqueous solution which contained 0.5 weight % iodine and 5 weight % potassium iodide. Afterwards, a cross-link treatment was carried out for 5 minutes using a 50° C. aqueous solution containing 10 weight % boric acid and 10 weight % potassium iodide. This was used for the PVA polarizer.

5. Preparation of the Polarizing Plate by Means of Wet Lamination Adhesion

A 5 weight % aqueous solution of commercial PVA (from Kuraray Co., Ltd., trade name: SI) was prepared. This aqueous solution was applied using Mayerbar #80 onto the protection films prepared in Examples 1–8 and Comparative examples 1–3. These protection films were wet-laminated on both sides of the polarizer. The obtained polarizing plate was dried at 45° C. for 72 hours. The following evaluation was carried out. The results are shown in Tables 1-3.

6. Durability Evaluation:

A 50 mm×50 mm square sample was bored from the aforesaid polarizing plate. This was used as the sample for the durability test.

"Durability Test"

Under the conditions of 90° C. dry and 60° C. 90% RH the sample was allowed to stand for 500 Hr. The transmittance change and the change in the degree of polarization after the 500 Hr durability test were measured with the following methods:

(1) The discoloration was evaluated by the change in the transmittance of the polarizing plate. The Y value was measured by using the spectral diffraction calorimeter ("TC-1800" from Tokyo Denshoku Co., Ltd.)

(2) Changes in the degree of polarization

The total transmittance was measured according to JIS K 7105. The degree of polarization before and after the durability test was obtained using the following equation, and the change was calculated.

$$\text{Degree of polarization } (\%) = \{(Y_0 - Y_{90})/(Y_0 + Y_{90})\}^{1/2} \times 100$$

$Y_0$: The total transmittance of two polarizing plates stacked together with their polarization axes parallel to each other.

$Y_{90}$: The total transmittance of two polarizing plates stacked together with their polarization axes perpendicular to each other.

"Evaluation of the Blocking Characteristics"

The blocking characteristics of the polyurethane resin layer after drying was evaluated based on tack and the existence of contact marks.

1. Tack:

The existence of tack was judged by finger touching.

2. Contact Marks:

On the polyurethane resin layer of the film, a different film was stacked and pushed with a finger. After peeling them off from each other, the existence of contact marks on the film was checked by visual observation.

TABLE 1

Changes in transmittance in the durability test

|  |  | 90° C. dry | | | 60° C., 90% RH | | |
|---|---|---|---|---|---|---|---|
|  |  | Initial value (%) | After 500 Hr (%) | Amount of change (Δ %) | Initial value (%) | After 500 Hr (%) | Amount of change (Δ %) |
| Example | 1 | 42.8 | 42.1 | −0.7 | 42.9 | 43.8 | 0.9 |
|  | 2 | 42.5 | 42.1 | −0.4 | 42.3 | 42.8 | 0.5 |
|  | 3 | 42.4 | 42.0 | −0.4 | 42.2 | 42.7 | 0.5 |
|  | 4 | 42.6 | 41.8 | −0.8 | 42.6 | 43.5 | 0.9 |
|  | 5 | 42.1 | 41.7 | −0.4 | 42.2 | 42.8 | 0.6 |
|  | 6 | 42.1 | 41.5 | −0.6 | 42.2 | 42.8 | 0.6 |
|  | 7 | 41.8 | 41.2 | −0.6 | 41.6 | 41.9 | 0.3 |
|  | 8 | 41.2 | 40.6 | −0.6 | 41.3 | 41.8 | 0.5 |
| Comparative example | 1 | 41.8 | 41.1 | −0.8 | 41.6 | 43.9 | 2.3 |
|  | 2 | 41.9 | 41.0 | −0.9 | 42.0 | 43.8 | 1.8 |
|  | 3 | 42.9 | 42.7 | −0.2 | 42.8 | 49.8 | 7.0 |

TABLE 2

Changes in the degree of polarization in the durability test

|  |  | 90° C. dry | | | 60° C., 90% RH | | |
|---|---|---|---|---|---|---|---|
|  |  | Initial value (%) | After 500 Hr (%) | Amount of change (Δ %) | Initial value (%) | After 500 Hr (%) | Amount of change (Δ %) |
| Example | 1 | 99.9 | 99.8 | −0.1 | 99.9 | 99.8 | −0.1 |
|  | 2 | 99.9 | 99.8 | −0.1 | 99.9 | 99.8 | −0.1 |
|  | 3 | 99.9 | 99.8 | −0.1 | 99.9 | 99.8 | −0.1 |
|  | 4 | 99.9 | 99.8 | −0.1 | 99.9 | 99.8 | −0.1 |
|  | 5 | 99.9 | 99.8 | −0.1 | 99.9 | 99.8 | −0.1 |
|  | 6 | 99.9 | 99.8 | −0.1 | 99.9 | 99.8 | −0.1 |
|  | 7 | 99.9 | 99.8 | −0.1 | 99.9 | 99.8 | −0.1 |
|  | 8 | 99.9 | 99.8 | −0.1 | 99.9 | 99.8 | −0.1 |
| Comparative example | 1 | 99.3 | 96.1 | −3.2 | 99.3 | 99.0 | −0.3 |
|  | 2 | 99.4 | 95.4 | −4.0 | 99.4 | 99.0 | −0.4 |
|  | 3 | 99.6 | 97.2 | −2.4 | 99.6 | 96.9 | −2.7 |

TABLE 3

Blocking

|  |  | Tack | Contact marks |
|---|---|---|---|
| Example | 1 | None | None |
|  | 2 | None | None |
|  | 3 | None | None |
|  | 4 | None | None |
|  | 5 | None | None |
|  | 6 | None | None |
|  | 7 | None | None |
|  | 8 | None | None |
| Comparative example | 1 | None | None |
|  | 2 | None | None |
|  | 3 | — | — |

These results indicate that the changes in the transmittance and in the degree of polarization are small for Examples, indicating excellent durability. The blocking characteristics of Examples are also excellent.

"Invention Described in Claims 6–8"

Preparation of the Polarizer.

An un-oriented PVA film with a thickness of 75 micrometers and a degree of the saponification of 99% was washed in water at room temperature. After the washing, a longitudinal uniaxial drawing of 5 times was carried out. While retaining the tension of this film, dichroism pigment was adsorbed to this film in an aqueous solution which contained 0.5 weight % iodine and 5 weight % potassium iodide. Afterwards, a cross-link treatment was carried out for 5 minutes using a 50° C. aqueous solution containing 10 weight % boric acid and 10 weight % potassium iodide. This was used as the PVA polarizer.

2. Preparation of the Acrylic Pressure Sensitive Adhesive and the Non-Support Tape 94.8 weight parts of butyl acrylate, 5 weight parts of acrylic acid, and 0.2 weight parts of 2-hydroxyethyl methacrylate were copolymerized in ethyl acetate under the presence of 0.3 weight parts of benzoyl peroxide. An ethyl acetate solution of the acrylic polymer with a weight average molecular weight (Mw) of 1,200,000 and a ratio between weight average molecular weight and number average molecular weight (Mw/Mn)=3.9 was obtained.

Toluene was added to an ethyl acetate solution of this acrylic polymer to dilute it, and a toluene solution of 13 weight % of the acrylic polymer was prepared. Two weight parts of an isocyanate crosslinking agent ("trade name: Coronate L" from Nippon Polyurethane Industries Co., Ltd.) was added to this solution, followed by stirring, and the mixture was applied on a releasing film. After the application, it was dried in two steps, 60° C.×5 minutes and 100° C.×5 minutes, to avoid foaming. An easy peeling type mould releasing film was laminated on the applied surface after the aforesaid film was dried. The method described above was used to prepare 2 kinds of non-support tape with different thicknesses (average dried thickness: 20 and 25 micrometers).

3. Preparation of the Protection Film 3-1. Thermoplastic Saturated Norbornene-Type Resin Film (1)

A 30 weight % cyclohexane solution of the ethylene-tetracyclo dodecen copolymer ("trade name APEL # 6015" from Mitsui Chemical Inc., hereafter referred to as "APEL") was prepared. This solution was cast on a PET substrate and dried in two steps, i.e. for 5 minutes at 60° C. and for 5 minutes at 120° C. After the drying, thermoplastic saturated norbornene-type resin film (1) was obtained by peeling it off from the PET substrate. The thickness after the drying was 50 micrometers.

3-2. Thermoplastic Saturated Norbornene-Type Resin Film (2)

A 30 weight % toluene solution of a hydrogenated ring-opened polymer of the norbornene-type monomer ("trade name: ZEONEX # 490 K" from Nippon Zeon Co. hereafter referred to as "ZEONEX") was prepared. This solution was cast on a PET substrate and dried in two steps, i.e. for 5 minutes at 60° C. and for 5 minutes at 120° C. After the drying, thermoplastic saturated norbornene-type resin film (2) was obtained by peeling it off from the PET substrate. The thickness after the drying was 50 micrometers.

3-3. Thermoplastic Saturated Norbornene-Type Resin Film (3)

A 35 weight % toluene solution of a ring-opened polymer hydrogenated product ("ARTON G" from JSR Co.) of the norbornene-type monomer was prepared. This solution was cast on a PET substrate and dried in two steps, i.e. for 5 minutes at 60' and for 5 minutes at 120° C. After the drying, thermoplastic saturated norbornene-type resin film (3) was obtained by peeling it off from the PET substrate. The thickness after the drying was 50 micrometers.

3-4. A Polycarbonate (PC) Resin Film

A 30 weight % dichloromethane solution of a PC resin ("trade name: Panlite L-1225 ZE" from Teijin Chemicals Co.) was prepared. This solution was cast on a PET substrate and dried in three steps, i.e. for 5 minutes at 60° C., for 5 minutes at 100° C., and for 5 minutes at 130° C. After the drying, polycarbonate (PC) resin film was obtained by peeling it off from the PET substrate. The thickness after the drying was 50 micrometers.

3-5. A Polysulfone (PSu) Resin Film.

A 30 weight % anisole solution of a PSu resin ("trade name: UDEL P-3500" from the Teijin Amoco Engineering Plastics Co.) was prepared. This solution was cast on a PET substrate and dried in three steps, i.e. for 5 minutes at 60° C., for 5 minutes at 120° C., and for 5 minutes at 170° C. After the drying, polysulfone (PSu) resin film was obtained by peeling it off from the PET substrate. The thickness after the drying was 50 micrometers.

4. Surface Treatment of the Protection Film

A corona discharge of 40/m²/minute was conducted on one side which is to be laminated on the polarizer.

Example 1'

18 weight parts of an isocyanate type hardener solution ("trade name: CAT-56" from Toyo-Morton Co., Ltd) was mixed in 100 weight parts of a polyester resin solution ("trade name: TM-593" from Toyo-Morton Co., Ltd). By diluting this solution in ethyl acetate, a polyurethane adhesive solution with a solid concentration of 30 weight % was prepared. This adhesive solution was applied to the PVA polarizer with a bar coater and dried at 80° C. for 1 minute. The thickness of the adhesive layer after drying was 3 micrometers. A roll heated up to 80'-was used to heat-laminate the aforesaid thermoplastic saturated norbornene-type resin film (1) on this adhesive layer of the polarizer. A lamination of the polarizer/thermoplastic saturated norbornene-type resin film (1) was obtained.

Separately, the aforesaid adhesive solution was applied and dried on another thermoplastic saturated norbornene-type resin film (1) under the same conditions as described above. The thickness of the adhesive layer was 3 micrometers. This film was heat-laminated on the polarizer side of the lamination of the polarizer/thermoplastic saturated norbornene-type resin film (1) in the same manner as described above. The obtained polarizing plate was evaluated after hardening for two days at 40° C.

Example 2'

1 weight part of an isocyanate type hardener solution ("trade name: TM-225 B" from Toyo-Morton Co., Ltd) was mixed in 16 weight parts of a polyester resin solution ("trade name: TM-225 A" from Toyo-Morton Co., Ltd) This solution was diluted with ethyl acetate to obtain a polyurethane adhesive solution with a solid concentration of 30 weight %. This adhesive solution was applied to the PVA polarizer with a bar coater and dried at 8° C. for 1 minute. The thickness of the adhesive layer after drying was 5 micrometers. A roll heated up to 80° C. was used to heat-laminate the aforesaid thermoplastic saturated norbornene-type resin film (2) on this adhesive layer of the polarizer. A lamination of the polarizer/thermoplastic saturated norbornene-type resin film (2) was obtained.

Separately, the aforesaid adhesive solution was applied and dried on another thermoplastic saturated norbornene-type resin film (2) under the same conditions as described above. The thickness of the adhesive layer was 5 micrometers. This film was heat-laminated on the polarizer side of the lamination of the polarizer/thermoplastic saturated norbornene-type resin film (2) in the same manner as described above. The obtained polarizing plate was evaluated after hardening for two days at 40° C.

Example 3'

8 weight parts of an isocyanate type hardener solution ("trade name: CAT-1" from Toyo-Morton Co., Ltd) was mixed in 100 weight parts of a polyester resin solution ("trade name: AD-585" from Toyo-Morton Co. Ltd). This solution was diluted with ethyl acetate to obtain a polyurethane adhesive solution with a solid concentration of 30 weight %. This adhesive solution was applied to the PVA polarizer with a bar coater and dried at 80° C. for 1 minute. The thickness of the adhesive layer after drying was 7 micrometers. A roll heated up to 80° C. was used to heat-laminate the aforesaid PC resin film on this adhesive layer of the polarizer to obtain a lamination of the polarizer/PC resin film.

Separately, the aforesaid adhesive solution was applied and dried on another thermoplastic saturated norbornene-type resin film (1) under the same conditions as described above. The thickness of the adhesive layer was 7 micrometers. This film was heat-laminated on the polarizer side of the lamination of the polarizer/PC resin film in the same manner as described above. The obtained polarizing plate was evaluated after hardening for two days at 40° C.

Example 4'

1 weight part of an isocyanate type hardener solution ("trade name: KL-75" from Dainippon Ink and Chemicals, Inc.) was mixed in 8 weight parts of a polyester resin solution ("trade name: Dicdry LX-903" from Dainippon Ink and Chemicals, Inc.). This solution was diluted with ethyl acetate to obtain a polyurethane adhesive solution with a solid concentration of 30 weight %.

This adhesive solution was applied to the PVA polarizer with a bar coater and dried at 80° C. for 1 minute. The thickness of the adhesive layer after drying was 10 micrometers. A roll heated up to 80° C. was used to heat-laminate the aforesaid PSu resin film on this adhesive layer of the polarizer to obtain a lamination of the polarizer/PSu resin film.

Separately, the aforesaid adhesive solution was applied and dried on another thermoplastic saturated norbornene-type resin film (1) under the same conditions as described above. The thickness of the adhesive layer was 10 micrometers. This film was heat-laminated on the polarizer side of the lamination of the polarizer/PSu resin film in the same manner as described above. The obtained polarizing plate was evaluated after hardening for two days at 40° C.

Example 5'

30 weight parts of an isocyanate type hardener ("trade name: EL-436 B" from Toyo-Morton Co., Ltd) was mixed in 100 weight parts of a polyester resin ("trade name: EL-436 A" from Toyo-Morton Co., Ltd). This was diluted with water to have a solid concentration of 10 weight %. A Mayerbar #8 was used to apply this on the thermoplastic saturated norbornene-type resin film (3). This film was wet-laminated on one side of the PVA polarizer. Similarly, thermoplastic saturated norbornene-type resin film (3) was wet-laminated on the other side of the PVA polarizer. The obtained polarizing plate was let stand in a thermostatic bath at 45° C. for 72 hours. The urethane type adhesive hardened when moisture in it dried. The thickness of the adhesive layer after hardening was 1 micrometer.

Comparative Example 1'

A easy-peeling side-separation type film on a non-support tape having an acrylic adhesive layer (the aforementioned 20-micrometer thick tape) was peeled and the tape was heat-laminated on the PVA polarizer. The other releasing film on the non-support tape was peeled and thermoplastic saturated norbornene-type resin film (1) was heat-laminated on it in the same manner. Thermoplastic saturated norbornene-type resin film (1) was laminated on the other polarizer surface of the obtained lamination under the same conditions to obtain a polarizing plate.

5. Preparation and the Durability Test of the Samples

The releasing film on the easy-peeling side of the aforesaid non-support tape (acrylic pressure sensitive adhesive layer: 25 micrometers) was peeled. This tape was laminated on the thermoplastic saturated norbornene-type resin film of the polarizing plates of Examples and Comparative examples. This sheet was punched out using a Thomson punching machine such that the polarizing axis was 45 degrees against the sides, and thus a 280 mm×190 mm rectangular sheet was obtained. The remaining releasing film on this sheet was peeled. This adhesion surface was pasted on a soda lime glass plate (1.2 mm thick) by means of a bench-top laminator. This glass plate was allowed to stand for 1 hour at room temperature, followed by 20 minutes autoclave treatment at 50N/cm². The glass plate was then allowed to stand for 1 hour at room temperature before the following two durability tests were conducted:

(1) Allowing to stand for 500 hours at 90° C., dry.
(2) Allowing to stand for 250 hours at 60° C. 95% RH.

The optical characteristics were evaluated by measuring the degree of polarization and the color difference after the durability test.

In addition, the appearance was evaluated by visual observation. The degree of polarization and the color difference were measured at each middle point of the four sides, 10 mm from the respective edge. The average of these 4 points was calculated.

"Degree of Polarizations"

The total transmittance was measured according to JIS K 7105. The degree of polarization was obtained by using the following equation:

$$\text{Degree of polarization (\%)} = \{(Y_0 - Y_{90})/(Y_0 + Y_{90})\}^{1/2} \times 100$$

$Y_0$: The total transmittance of two polarizing plates stacked together with their polarization axes parallel to each other.
$Y_{90}$: The total transmittance of two polarizing plates stacked together with their polarization axes perpendicular to each other.

"Color Differences"

The color difference was measured according to JIS Z 8729. Measurements were carried out at 4 points each using a C light source. Using Hunter's color-difference formula ($E_8$), the color difference was calculated from L, a, and b values.

The results are shown in "Table 1'".

TABLE 1'

| | 90° C. dry × 500 Hr | | | 60° C. 95% RH × 250 Hr | | |
|---|---|---|---|---|---|---|
| | Degree of polarization[a] (%) | Color difference | Appearance | Degree of polarization[a] (%) | Color difference | Appearance |
| Example 1' | 99.7 | 0.39 | No abnormality | 97.5 | 0.51 | No abnormality |

TABLE 1'-continued

| | 90° C. dry × 500 Hr | | | 60° C. 95% RH × 250 Hr | | |
|---|---|---|---|---|---|---|
| | Degree of polarization[a] (%) | Color difference | Appearance | Degree of polarization[a] (%) | Color difference | Appearance |
| Example 2' | 99.8 | 0.27 | No abnormality | 96.9 | 0.55 | No abnormality |
| Example 3' | 99.7 | 0.48 | No abnormality | 95.7 | 0.65 | No abnormality |
| Example 4' | 99.8 | 0.40 | No abnormality | 96.0 | 0.62 | No abnormality |
| Example 5' | 99.7 | 0.53 | No abnormality | 99.6 | 0.40 | No abnormality |
| Comparative example 1' | 97.0 | 0.91 | A large amount of foam | 89.0 | 4.0 | No abnormality |

[a]The initial value is 99%.

For Examples, the degree of polarization and the color difference are stable even after the durability test. There is no abnormality in the appearance either. Therefore, the polarizing plate of the present invention has excellent durability.

INDUSTRIAL APPLICABILITY

The polarizing plate protection film of the present invention has excellent adhesion with the polarizer because of the polyurethane resin layer formed on the thermoplastic saturated norbornene-type resin film.

In addition, blocking of the protection film can be prevented by the PVA layer formed on the polyurethane resin layer.

The polarizing plate using the protection film of the present invention is excellent in terms of durability under high temperature and high humidity conditions, and it is suitably used for liquid crystal displays and such.

What is claimed is:

1. A polarizing plate protection film wherein a polyurethane resin layer and a non-polarizer polyvinyl alcohol layer are formed in this order on a thermoplastic saturated norbornene-type resin film.

2. The polarizing plate protection film of claim 1, wherein said polyurethane resin layer consists of a polyurethane adhesive which contains modified polyisocyanate.

3. The polarizing plate protection film of claim 1, wherein said polyurethane resin layer consists of a water-type polyurethane adhesive.

4. A polarizing plate having on at least one side thereof a polarizing plate protection film, said polarizing plate protection film consisting of a thermoplastic saturated norbornene-type resin film on which a polyurethane resin layer is formed, said polarizing plate protection film being bonded onto at least one side of the polarizer by wet lamination using a polyvinyl alcohol adhesive.

5. A polarizing plate protection film wherein a polyurethane resin layer and a polyvinyl alcohol layer are formed in this order on a thermoplastic saturated norbornene-type resin film, said polarizing plate protection film being bonded onto at least one side of a polarizer by wet lamination using a polyvinyl alcohol-type adhesive.

6. A polarizing plate protection film consisting of a thermoplastic saturated norbornene-type resin film on which a polyurethane resin layer is formed, said polyurethane resin layer consisting of a polyurethane adhesive which contains modified polyisocyanate, said polarizing plate protection film being bonded onto at least one side of a polarizer by wet lamination using a polyvinyl alcohol-type adhesive.

7. A polarizing plate protection film consisting of a thermoplastic saturated norbornene-type resin film on which a polyurethane resin layer is formed, said polyurethane resin layer consisting of a water-type polyurethane adhesive, said polarizing plate protection film being bonded onto at least one side of the polarizer by wet lamination using a polyvinyl alcohol-type adhesive.

8. A polarizing plate comprising:
   (a) a polyvinyl alcohol polarizer having on one side thereof a liquid crystal cell,
   (b) a polarizing plate protection film consisting of a thermoplastic saturated norbornene-type resin film,
   (c) a thin film of a polyurethane resin formed and bonded to said thermoplastic saturated norbornene-type resin film, said polyurethane film having a thickness of from about 0.01–20 microns, and being formed from a two-component type with a main agent consisting of a polyester resin,
   (d) said polyurethane layer in (c) above being bonded to a side of the polyvinyl alcohol polarizer having a liquid crystal cell thereon.

9. The polarizing plate of claim 8, further comprising a polyvinyl alcohol adhesive bonding said layer of a polyurethane resin of the polarizing plate protection film to a side of the polyvinyl alcohol polarizer having liquid crystal cells.

* * * * *